United States Patent [19]

Taylor et al.

[11] 4,348,863
[45] Sep. 14, 1982

[54] REGENERATIVE ENERGY TRANSFER SYSTEM

[76] Inventors: Heyward T. Taylor, 1604 Evers Dr., McLean, Va. 22101; Michael B. Lambert, 5018 King David Blvd., Annandale, Va. 22003

[21] Appl. No.: 956,316

[22] Filed: Oct. 31, 1978

[51] Int. Cl.³ .......................... F15B 1/02; F15B 3/00; F15B 11/08
[52] U.S. Cl. ...................................... 60/327; 60/404; 60/413; 60/415; 91/6
[58] Field of Search .................. 60/407, 409, 413, 414, 60/415, 418, 422, 327, 370, 371, 404, 416; 91/5, 6, 532, 516; 417/426, 405, 375

[56] References Cited

U.S. PATENT DOCUMENTS

| | | | |
|---|---|---|---|
| 859,235 | 7/1907 | MacFarren | 60/412 X |
| 2,239,566 | 4/1941 | Mercier | 60/417 |
| 2,285,604 | 6/1942 | Mercier | 60/417 |
| 2,641,106 | 6/1953 | Jelinek | 60/417 |
| 2,751,144 | 6/1956 | Troendle | 417/375 X |
| 2,988,890 | 6/1961 | Oishei et al. | 60/413 |
| 3,349,670 | 10/1967 | Bahl et al. | 91/516 |
| 3,465,519 | 9/1969 | McAlvay et al. | 91/516 X |
| 3,693,351 | 9/1972 | Minkus | 60/370 |
| 3,719,044 | 3/1973 | Bach | 60/404 |
| 3,765,180 | 10/1973 | Brown | 60/370 |
| 3,793,835 | 2/1974 | Larralde | 60/413 |
| 3,841,095 | 10/1974 | Baker | 60/404 |
| 3,847,058 | 11/1974 | Manor | 91/467 X |
| 3,885,387 | 5/1975 | Simington | 60/370 |
| 3,903,696 | 9/1975 | Carman | 60/414 |
| 3,910,043 | 10/1975 | Clerk | 60/413 |
| 3,925,984 | 12/1975 | Holleyman | 60/370 |
| 3,977,815 | 8/1976 | Stull | 417/375 X |
| 4,037,409 | 7/1977 | Leibach | 60/413 |
| 4,060,987 | 12/1977 | Fisch et al. | 60/409 |
| 4,085,587 | 4/1978 | Garlinghouse | 60/404 X |

FOREIGN PATENT DOCUMENTS 1033739   6/1966   United Kingdom .................... 91/5

*Primary Examiner*—Irwin C. Cohen
*Attorney, Agent, or Firm*—Neil F. Markva

[57] ABSTRACT

A method and apparatus uses energy in an energy output system having a main power source, an energy transmission system and a mechanical output. A first portion of energy generated with the main power source is used to drive the mechanical output under operating conditions. The unused second portion of the energy is diverted to an energy storing means. The second portion of energy is then stored and regenerated on demand. The energy may be used directly to augment the energy requirements in the energy output system during peak periods. In a specific embodiment, a compressed air system is used for storing the energy not used in driving a mechanical output connected to the power source by an energy transmission assembly. The energy transmission in the energy output system is a hydraulic fluid transmission system. A hydraulic fluid diverting mechanism is used to maintain the flow of hydraulic fluid to the mechanical output and to the compressed air energy storage system.

23 Claims, 4 Drawing Figures

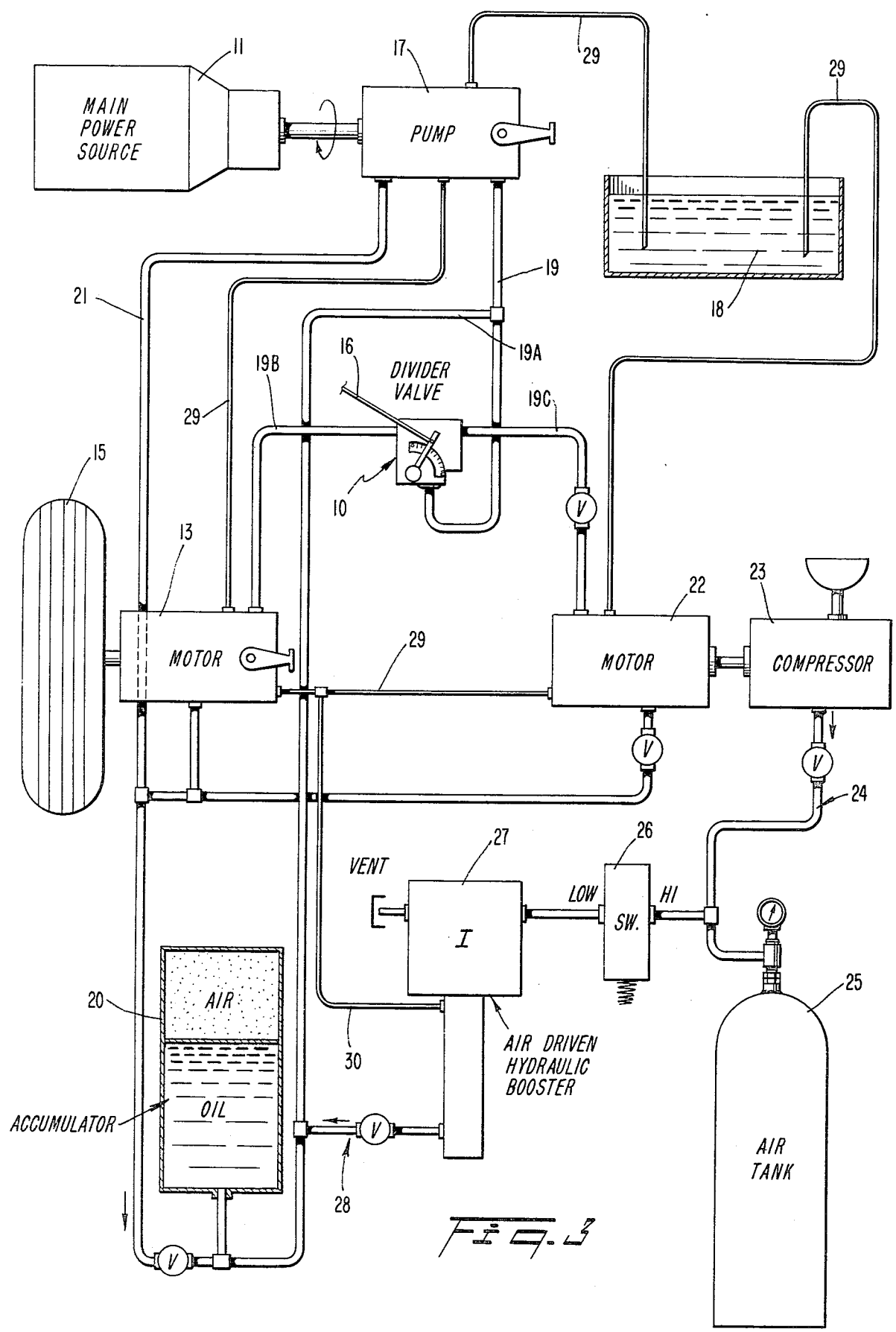

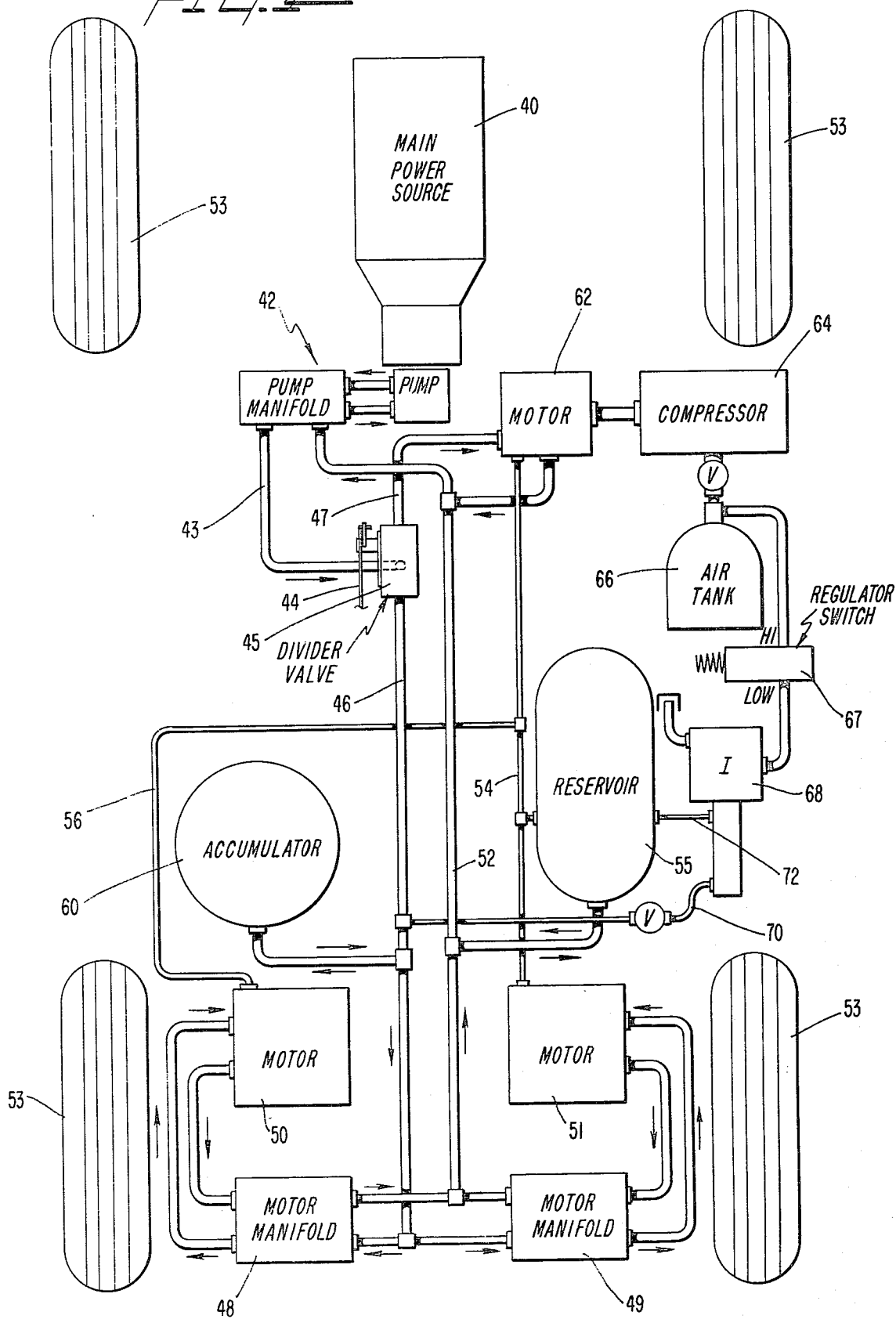

REGENERATIVE ENERGY TRANSFER SYSTEM

TECHNICAL FIELD

This invention relates to an energy storage system useful in combination with primary energy output systems. More specifically, the invention relates to a process and apparatus for regenerating energy not used to drive a primary mechanical output wherein the unused portion of the primary energy output system is stored until it is in demand.

BACKGROUND ART

It is well known to store energy in an energy output system wherein that energy is recovered and made useful in some form. Flywheels and batteries have been used in various combinations with primary energy output systems to accomplish this result. It is also known to use compression cylinders for the purpose of storing energy for driving a system during high-low conditions. Examples of such systems are shown in U.S. Pat. Nos. 3,693,351, 3,910,043 and 4,037,409.

U.S. Pat. No. 3,693,351 discloses an anti-pollution regenerative compressed air system. Here, the primary driving source is compressed air. A secondary energy source is established by compressing air during periods while the automobile is not drawing full power through the use of a combination of a pressure booster tank and high pressure accumulator tank. There is no provision in this prior art system, however, for storing power that is not otherwise used to drive the mechanical output in the primary piston assembly.

U.S. Pat. No. 3,910,043 discloses an energy accumulating system having a combination of a flywheel and hydraulic primary pump/motor. This hydraulic transmission assembly has a control system including pedals and/or levers which control the flywheel/pump complex in a manner to determine the pressure useful in the hydraulic primary power circuit.

U.S. Pat. No. 4,037,409 shows a gas turbine engine used in combination with a flywheel and hydraulic transmission assembly. The flywheel and the hydraulic transmission are driven by the same input shaft leading from a gas turbine engine. Thus, all of the energy generated in the motor unit of this system is used to rotate the drive shaft. At the same time, the energy required to turn the wheels of the vehicle will not always require all of the energy of the hydraulic motor.

Other well known compressed air engines have various types of auxiliary air compressors and secondary power supplies including batteries connected thereto. See particularly U.S. Pat. Nos. 3,765,180, 3,847,058 and 3,925,984.

U.S. Pat. No. 3,793,835 shows a variable rate hydraulic transmission system wherein the pressure on the hydraulic fluid is maintained generally constant by a gaseous medium. However, this system is static and the compressed gaseous medium supply acts as a shock absorber providing an equilibrium balance to the hydraulic fluid system. The compressed gaseous medium operates in conjunction with the well known hydraulic fluid accumulators designed for this purpose.

Most recent efforts to provide a system for storing kinetic energy in a vehicle is disclosed in U.S. Pat. No. 3,903,696. Here, a hydraulic system is used to collect and store energy upon the braking of the vehicle. The hydraulic accumulator is connected in a particular way to the hydraulic fluid reservoir with a capacity for the operator to selectively permit fluid flow in the system to store energy on braking of the vehicle and release the stored energy to accelerate the vehicle. However, there is no provision for recovering any of the hydraulic fluid energy not required during the operation of the mechanical output; namely, the vehicle wheels during operation of the system.

Energy transfer systems are used for the purpose of changing the form of any material such as grinding grain, cutting wood chips, baling cotton or compressing old automobiles. A known system comprises a full tree, wood chipping machine having an engine operating at varying energy levels depending upon the size of the trees being chipped. An additional engine of equal size was installed when it was discovered that the initial single engine system was using too much fuel. In this instance, both engines are operated at optimum efficiency modes at all times with the combined engines using one-third as much fuel as the original one engine used alone.

Conventional drive energy transfer systems in vehicles and other machinery, couple the power source directly to the driven implement using gears, shafts, chains or belts. Thus, a fixed relationship is established between the power transferred to the implement and the speed of the power source. This relationship is a function of the gear ratios and the like selected for the transmission assembly. The power source must be large enough to provide the amount of power that is required during the peak demand periods in such a system. Typically, peak demand periods constitute a very small portion of the total operation time. In other words, the systems are generally overdesigned with respect to the average operating capacities. Clearly, severe efficiency penalties result with the power source operating in an inefficient load range most of the time. With the overdesigned power source, there is an excessive weight demanding further wasteful power consumption.

As a vehicle, or other implement, is accelerated to its working speed, much of the energy from the power source is converted to kinetic energy. The kinetic energy can be mathematically related to the mass of each moving part and the square of its velocity. Such kinetic energy is appreciable in the operation of vehicles and heavy machinery. Such energy is wasted through the use of braking systems and other frictional forces. Even vehicles that motor their engines for braking, transfer the kinetic energy of motion into wasted energy at the expense of additional fuel use. None of the kinetic energy is captured. Consequently, the power source must supply the entire amount of energy required for each acceleration and load cycle.

As noted above, prior art attempts have used a simple hydraulic drive system with a hydraulic accumulator to store excess power from an internal combustion engine. This is an attempt to use or store the extra power that could be provided by the power source when workloads are low and during periods of deceleration. The accumulator in such a prior art system has only a finite capacity for energy storage. Thus, there is an intermittent cycling of the engine to charge the accumulator. Once maximum hydraulic working pressure is reached in the accumulator, the capability of storing any further energy disappears and the charging engine must be stopped. When the accumulator pressure drops below the minimum, the charging engine is restarted. With this fluctuation in hydraulic pressure, axial torque and speed cannot be smoothly controlled. Consequently, the repeated on and off cycling causes extreme wear and inefficient operation of the engine.

Kinetic energy cannot be effectively recaptured and stored in the accumulator type system if the engine is running. That is, the engine would be driven in a motoring mode which absorbs energy. Furthermore, the accumultor is unable to accept additional power input when it is near its maximum pressure. When the engine is not running, it cannot add power to the power delivered by the accumulator for maximum loads. The vehicle with the accumulator type system must carry the weight of the engine even when it is not contributing power to the system. An electronic processor becomes necessary to effect the complex control for the system. Failure of such a processor renders a vehicle inoperable and irreparable by the average driver or mechanic.

DISCLOSURE OF THE INVENTION

The primary object of this invention is to provide a method and an apparatus for storing energy in a compressed fluid medium until the recovering of the energy is required.

Another object of the invention is to provide a regenerative energy transfer system which may be used in combination with an energy output system having a main power source, an energy transmission system, and a mechanical output wherein the energy transfer system is capable of storing kinetic energy not required to drive the mechanical output during operation of the primary system.

A further object of this invention is to provide a method of storing kinetic energy from a primary power source during its operation resulting in efficient operation of the power source, maximum use of developed power and regenerative braking.

A still further object of this invention is to provide a compressed fluid system wherein the effective usable power of a primary power source is increased during periods of peak demand by the release of energy that is stored during longer periods of low demand.

Yet another object of the invention is to provide a method of transferring, regenerating, storing and concentrating energy using pneumatic devices coupled with other mechanical and hydraulic components properly connected between a source of power and a driven implement or mechanical output.

The present invention is directed to a method and a system for storing energy not used in driving a mechanical output means connected to a power source by an energy transmission assembly. A compressed fluid system of this invention comprises means for compressing fluid to be stored in a storing means. The fluid compressing means is operated by a drive mechanism. Means connected between the transmission assembly and the drive means is used for diverting the energy not used in driving the mechanical output means from the transmission assembly to the drive means. The drive means is effective to produce compressed fluid with the fluid compressing means. In a specific embodiment, the fluid medium is air as a gaseous medium.

The energy transfer system includes an arrangement of pneumatic, hydraulic and other mechanical and/or electrical devices connected between a power source and a driven implement. The transfer system transmits power from the power source to the implement and accumulates and stores excess kinetic energy generated by the power source but not immediately used by the implement. Provision is also made to recapture the kinetic energy of the implement during slow-down periods. The stored kinetic energy is released as required during periods of peak demand at a power level that may be greater than the full load capability of the connected power source.

A feature of the present invention is the use of a constant main power supply which may be designed to meet the average power demand of a mechanical output rather than its peak demand. Thus, the main power source can be set to run continuously at an efficient power setting. The main power source may be automatically controlled to operate at idle or at a minimum maintenance level during periods of negligible power demand, e.g., when a vehicle is temporarily stopped. This provides a continuous source of power so that accessories such as vehicle air conditioners, alternators and heaters can be operated.

Another feature of the invention is the use of a pressurized storage vessel containing air or other gaseous medium as a working medium to transfer, accumulate, store and release energy. The vessel is filled and pressurized by a gas compressor. The compressor operates on excess power or kinetic energy from the main power source during periods of low demand on the main source. Useful power recovered from kinetic energy by regenerative braking process may also be used to pressurize gas with the gas compressor.

A further feature is to use the pressurized vessel in combination with a hydraulic transmission system. A gas driven hydraulic driven booster pump is operated by the gas from the pressurized vessel to maintain high working pressures in the hydraulic transmission system. The hydraulic transmission system has a closed loop to transfer energy directly from the main power source to the implement and vice versa during deceleration. The transmission system includes an accumulator to smooth pressure pulses and maintain sufficient quantity of high pressure hydraulic fluid to provide maximum power for peak loads.

BRIEF DESCRIPTION OF DRAWINGS

Other objects of this invention will appear in the following description and appended claims, reference being made to the accompanying drawings forming a part of the specification wherein like reference characters designate corresponding parts in the several views.

FIG. 3 is a schematic flow diagram showing a compressed air system in combination with a hydraulic transmission assembly; and FIG. 4 is a schematic diagram of a hydraulic system in combination with a compressed air system used in a vehicle.

DETAILED DESCRIPTION

Figure 1:
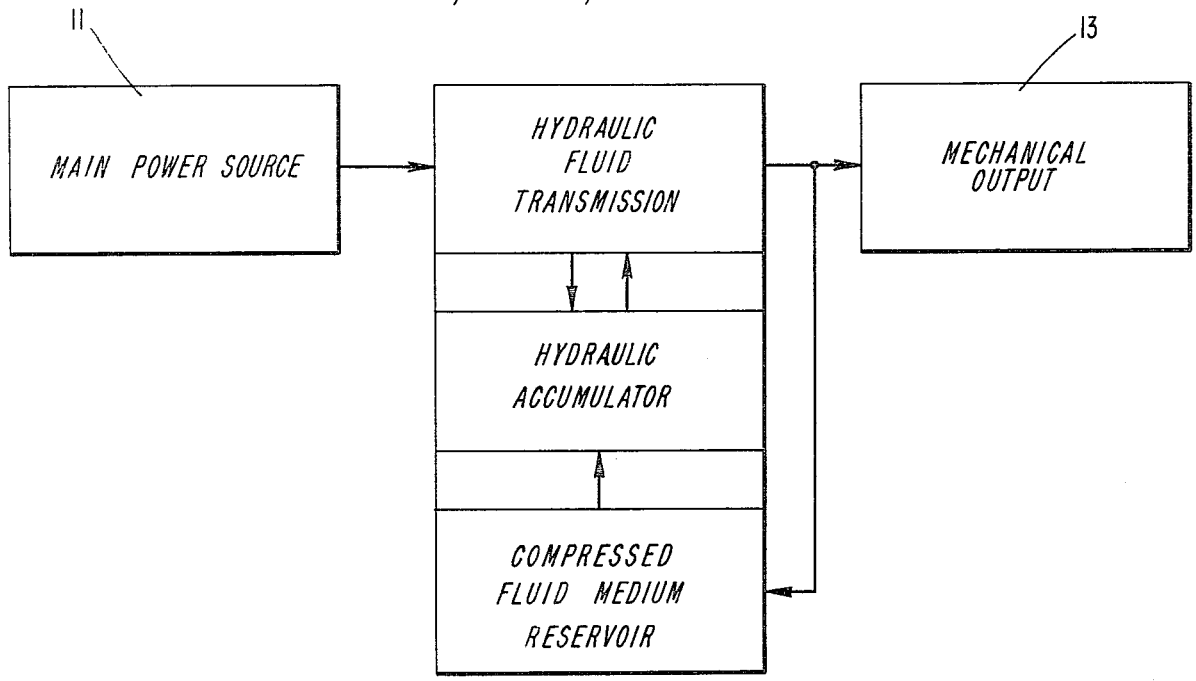
FIG. 1 is a schematic diagram showing the use of the compressed fluid medium reservoir in combination with a hydraulic fluid transmission assembly.

The general diagrammatic flow of energy is shown in FIG. 1 for the regenerative energy transfer system of this invention. All of the energy or power from the main power source is used to drive a hydraulic fluid transmission system. The hydraulic fluid transmission assembly includes a hydraulic accumulator which receives energy via fluid pressure and returns same during times when there is a need for additional power surge. Thus, the main power source drives the hydraulic fluid transmission assembly with a constant flow of transmission fluid due to the action of the hydraulic accumulator.

Figure 2:
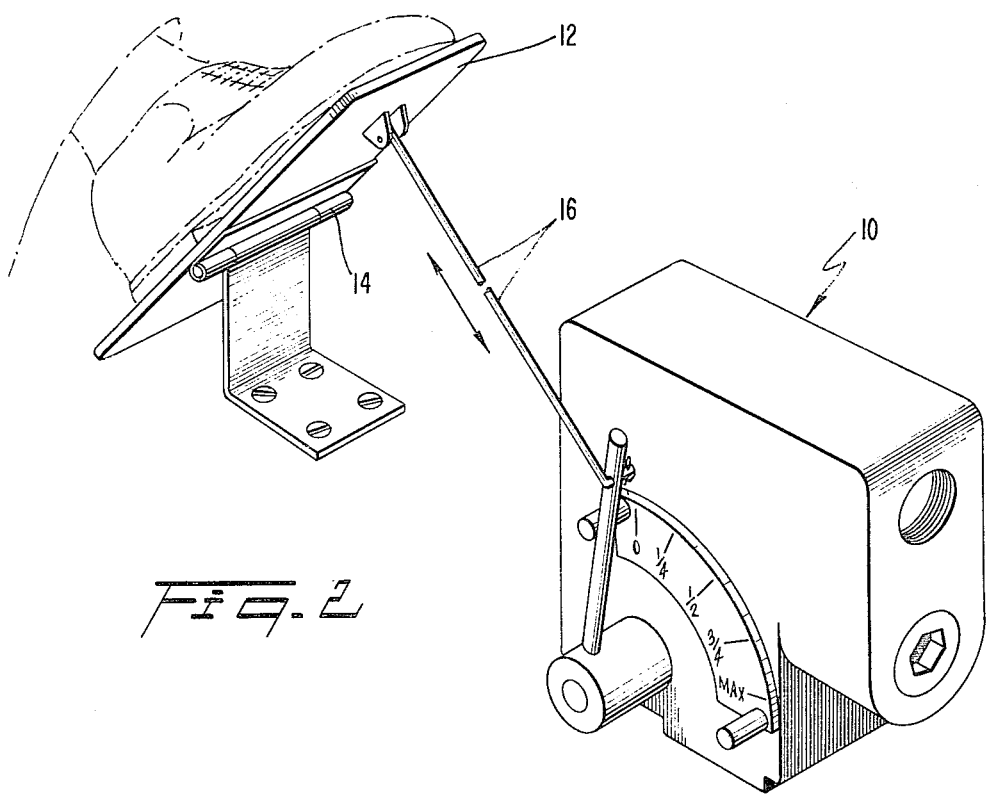
FIG. 2 is a perspective view of a hydraulic fluid diverting mechanism used in one embodiment of the invention.

The power from the hydraulic fluid transmission system is divided between the mechanical output and the compressor for the compressed fluid medium reservoir. The mechanical output is the driven implement having priority on the power it needs through a flow divider valve 10 which is shown in FIG. 2. As shown, the flow divider valve 10 has a full range flow control of hydraulic fluid in a hydraulic fluid transmission system. Such a divider valve is very well known in the prior art. Control pedal 12 pivots around hinge 14 to operate control rod 16. Pedal 12 is used both as an accelerator and a brake for the driven implement by either increasing or decreasing the flow of fluid to the mechanical output as shown in FIG. 1.

In FIG. 3, main power source 11 drives hydraulic fluid pump 17 which transmits the hydraulic fluid throughout the system as described hereinbelow. The main power source may be an internal combustion machine, gas turbine, electric motor, steam engine, wind machine, coal-fired or solar powered engine and the like.

The hydraulic transmission system is charged with hydraulic fluid from reservoir 18 through the charge and cooling line 29. The main drive pressure line 19 has three branches. Branch 19A carries hydraulic fluid directly to the accumulator 20. Divider valve 10 directs hydraulic fluid through Branch 19B to drive motor 13 to operate wheel 15. Hydraulic fluid not required to drive motor 13 is diverted via branch line 19C to operate the compressed air regenerative energy transfer system.

Hydraulic fluid motor 22 operates air compressor 23. Compressed air is stored in tank 25 via line 24. The air compressor operates at 3000 p.s.i. which is the same as the maximum capacity of the air tank 25 in this specific embodiment.

An air driven hydraulic booster mechanism 27 is used to recover the kinetic energy stored in the compressed fluid medium reservoir, i.e., air tank 25. It is desirable to maintain a constant pressure in the hydraulic fluid system including the pump 17, accumulator 20 and output motor 13. The air driven hydraulic booster 27 is used to increase or maintain the pressure within the system by supplementing the fluid pressure in line 19 via line 28. The supplement flows from fluid line 30 leading from the reservoir 18 via line 29 and motor 22 to booster 27 and out line 28. As is well known, an air driven hydraulic booster having a cylinder ratio of 100:1 is common. Thus, to maintain 3000 p.s.i. in line 28 leading to line 19 of the hydraulic transmission system, the input pressure from the air tank 25 to the booster mechanism 27 would be 30 p.s.i. A standard pressure regulating device 26 is used to maintain the proper air pressure balance in the compressed air system to operate the hydraulic booster pump 27.

The booster pump 27 is commercially readily available. It is conventionally used for the purpose of taking normal household air or shop air at ground 100 to 150 p.s.i. and providing a short duration of high pressure hydraulic fluid to hydraulic cylinders for clamping or mechanical actuators. To have the necessary pressure to drive the hydraulic cylinders, air booster pumps are designed to take air line pressure and provide short durations of high hydraulic pressure.

In operation, the main power source 11 is held at a constant output power level. A constant energy level is maintained in the hydraulic system with hydraulic pump 17 providing the desired pressure and volume of flow to operate wheel 15 at a full range of speeds and loads. Where there is a changing or dynamic output system, the energy demands will change. With a constant energy level being maintained in the hydraulic fluid system, divider valve 10 is operated to allow only that amount of hydraulic fluid in line 19B which is required to operate wheel 15 via hydraulic fluid motor 13. The remaining hydraulic fluid not required to drive the output wheel 15 is directed through branch line 19C to hydraulic motor 22 to drive compressor 23. Thus, branch line 19C is the excess energy line.

During the deceleration of wheel 15, the hydraulic motor 13 becomes a pump. That is, the direction of the hydraulic oil flow remains the same but the pressure within the system is reversed. Thus, line 21, which normally is a suction line for pump 17, becomes pressurized when the system is reversed. Consequently, kinetic energy of wheel 15 is transformed to hydraulic energy by the motor 13 acting as a pump. This hydraulic energy is delivered via line 21 to pump 17 tending to drive the pump as a motor, and from pump 17 through line 19, divider valve 10, and line 19C to motor 22. Motor 22 then drives compressor 23 at a faster rate in proportion to the rate of deceleration of wheel 15. Thus, braking energy is captured in compressed air tank 25.

The divider or diverting valve 10 enables the speed of the vehicle to be directly proportioned by the position of the valve between zero and the maximum positions. The operator controls the rate of both the acceleration and the deceleration of the vehicle. That is, the speed is proportional to the position of the control valve 10 which is regulated through control pedal 12. Acceleration is proportional to the rate of change of the valve through the use of the control rod 16. Thus, if the valve is moved from zero to a maximum very quickly, the requisite amount of energy will be made available to the whole system. For safety reasons, it is possible that some type of control flow limiters be used so that there may be a limit as to how much hydraulic power enters the drive motor of the mechanical output. Reverse drive of wheel 15 is accomplished by reversing the swashplate in motor 13.

The schematic diagram of FIG. 4 illustrates how the energy transfer system of this invention is incorporated into a known hydraulically powered vehicle. Such a vehicle is disclosed in U.S. Pat. No. 3,903,696 and discussed in an article appearing in *Mechanix Illustrated* dated November 1977.

The main power source 40 drives the pump which pressures fluid in a manifold, generally designated 42, to provide a constant hydraulic pressure in line 43. Accumulator 60, reservoir 55, motor manifold 48 and motor 50, motor manifold 49 and motor 51 operate in a standard manner according to the prior art to drive the vehicle supported on its wheels 53.

The compressed fluid system of this invention is used with this earlier energy storage transmission to provide a dynamic system for continuously storing unused energy from the primary hydraulic transmission system. The divider valve 45 is inserted into the hydraulic fluid line 43. Operation of the control rod 44 controls the amount of fluid flow to the hydraulic line 46 and to the energy storage or excess energy line 47. Only the amount of hydraulic fluid required to operate the motors 50 and 51 at the desired level is directed through the transmission line 46. The return line 52 is used to complete the cycle of hydraulic transmission flow as indicated by the arrows adjacent the various operating branch lines as shown in FIG. 4.

The energy transmitted by the hydraulic fluid in excess energy line 47 drives motor 62 which operates compressor 64 for compressing air and storing same in air tank 66. When accumulator 60 is used over a few cycles of startups, the hydraulic fluid therein is completely dissipated. Thus, its use by itself is extremely limited. Compressed air storage tank 66, however, is used to store compressed air over an extremely long term. Air driven booster pump 68 augments the primary energy system through hydraulic transmission line 70 which receives its hydraulic fluid from reservoir 55 via line 72.

Accumulator 60, by itself, constitutes a short range, high demand, fast delivery means in the primary energy storage transmission system. However, with the energy transfer system of this invention, a further long range, large storage capacity of energy is possible over a sustained period of time. Thus, the inherent problems associated with the primary energy storage transmission system are overcome.

The energy transfer system of this invention provides up to 3600 p.s.i. of hydraulic pressure in the primary pressure lines on demand over a sustained period of time. Air tank 66 may be maintained up to about 3000 p.s.i. or any other desired level. Regulator switch 67 is used to operate booster pump 68 with an air pressure of 30 p.s.i., as noted in the embodiment of FIG. 3.

Here, the energy transfer mechanism is using compressed air and known as a Compressed Air Regenerative Energy Transfer System (hereinafter referred to as CARET System). The fluid hydraulic transmission system includes a hydraulic accumulator that is used in tandem with the long range high storage capacity CARET System. Compressed air may be used either directly from air compressor 64 or from the accumulated storage air tank 66, depending on the demand required in the hydraulic transmission system. Compressor 64 operates only when there is a surplus power supply from the main power source 40.

Main power source 40 may operate at a constant speed with a relatively average power demand, e.g., 40% of the peak demand. The remaining 60% of the power is diverted to excess energy line 47 to drive compressor 64 via motor 62. The load divider valve 45 has a priority to drive the wheels 53 so that there is never any lack of power to drive the wheels. The divider valve 45 may be operated by the operator himself. The storage of the unused power is done automatically without the operator having to be consciously involved in the process, i.e., the hydraulic booster pump 68 operates automatically so that when the oil supply is depleted or below a certain pressure, pump 68 automatically goes into action and boosts the primary hydraulic system through line 70, as previously discussed.

Hydraulic transmission systems could be used in combination with the CARET System without accumulator 60. In this case, a low power transmission would be effected by the transmission assembly.

When main power source 40 operates continuously, as in most applications, much of the generated power can be accumulated over long intervals because peak power is needed infrequently. Power is a measure of the rate at which energy is delivered and can be effectively increased above the actual capability of the main power source 40. This permits peak power demands to be met by the stored energy. The main power source 40 can be much smaller than otherwise required to do the job without the CARET System. Automobile engines are presently designed to drive the automobile at speeds far in excess of 55 miles an hour. However, with this invention, an automobile engine may be designed to drive the automobile 55 miles an hour under normal conditions but designed to rely on the CARET System to drive the automobile at 70 miles an hour if circumstances required the faster speed. Thus, the initial cost for a main power source can be reduced. All of the requisite power savings are then obtained by having less weight and less fuel consumed to run the main power source which is operating at a constant, efficient setting.

It is possible, with sufficient compressed air capacity in the CARET System, that a vehicle may be operated independently for extended periods of time without the aid of the main power source. In this instance, the main power source could be maintained at a fixed location with the vehicle and the CARET System being movable away from the fixed location, thereby requiring an occasional recharging and/or replacement of air pressure vessels which would lengthen the vehicle operation indefinitely.

ADVANTAGES OF THE INVENTION

The energy transfer system of this invention transfers energy with minimum net energy losses regardless of the purpose for which the transferred energy is used. That is, the primary energy generator always operates in its most efficient mode which maximizes the quotient determined by dividing the energy out by the energy in. The CARET System allows the energy generator to operate in this maximum efficiency mode because increased energy demands at peak loads are met by surplus energy stored in the form of compressed air or other compressed fluid medium. The surplus energy comes from regenerated braking energy and from excess power produced by the main power source when the power demands in the primary system are low. The CARET System is the only energy transfer system that captures and stores both braking energy and excessive primary generator energy. Further, all of the energy that is captured and stored may be recovered through a compressed fluid medium operating in combination with the primary transmission assembly.

The energy transfer system of this invention may be used for numerous applications such as in material handling, transportation vehicles, environmental control mechanisms, such as air conditioning, and the like. The CARET System is effective as an energy transfer and storage device regardless of the source of power for the primary energy generator. External heat engines, such as the Stirling engine, could be applied to many new applications to take advantage of low noise and emission levels when used in combination with the CARET System.

The system of this invention may be used to store energy from a power company during off-peak hours or weekends to take advantage of lower rates or to extend the capacity of the power plant. With sufficient compressed fluid medium capacity, the system could provide normal energy for a household or business concern for one or more days without using commercial power during prime time.

The basic advantage of the compressed fluid medium system of this invention, is that it is storing energy as potential energy rather than kinetic energy, such as in flywheels. There are no moving parts requiring bearings or any gyroscopic effects. There are no size limitations. Air tanks are lightweight for the equivalent energy that they can hold. As the stored energy capacity increases, the ratio of power to weight improves with the compressed fluid medium. This is unlike prior art energy storage mechanisms, such as flywheels.

While the regenerative energy transfer system has been shown and described in detail, it is obvious that this invention is not to be considered as being limited to the exact form disclosed, and that changes in detail and construction may be made therein within the scope of the invention, as set forth in the claims which follow without departing from the spirit thereof.

We claim:

1. In a system having a power source driving a mechanical output means through an energy transmission system, a compressed fluid system for storing kinetic energy not used in driving the mechanical output means connected to a power source by an energy transmission assembly, said compressed fluid system comprising:
   (a) storing means for maintaining stored amounts of compressed fluid,
   (b) means for compressing fluid from a continuous supply of fluid for said storing means,
   (c) drive means for operating said fluid compressing means to direct fluid from said continuous supply to said storing means, and
   (d) diverting means connected between said transmission assembly and said drive means for directing the amount of said kinetic energy proportionally not used in driving said mechanical output means away from said transmission assembly to said drive means,
   (e) said drive means being effective to produce a stored amount of compressed fluid from said continuous supply by operating said fluid compressing means,
   (f) said stored amount being directly related to said proportionally directed amount of kinetic energy,
   (g) means connected to said energy transmission assembly to recapture kinetic energy on demand from the stored amounts of compressed fluid produced by said diverted unused kinetic energy for driving said mechanical output means.

2. A compressed fluid system as defined in claim 1 wherein
   said continuous supply of fluid is gaseous.

3. A compressed fluid system as defined in claim 1 wherein
   said continuous supply of fluid is air.

4. A compressed fluid medium system for recapturing kinetic energy not used in driving a mechanical output means driven by a hydraulic transmission assembly, said compressed fluid medium system comprising:
   (a) fluid medium compressing means for compressing fluid medium from a continuous supply of fluid medium,
   (b) hydraulic fluid drive motor means for driving said fluid medium compressing means,
   (c) diverting means for directing hydraulic transmission fluid from said transmission assembly to said drive motor means,
   (d) said diverting means including means to control said hydraulic transmission fluid in an amount proportional to the kinetic energy not used for driving said mechanical output means by said transmission assembly,
   (e) said drive motor means being effective to produce stored amounts of compressed fluid medium by operating said fluid medium compressing means during operation of said compressed fluid medium system, and
   (f) energy conversion means is connected to the hydraulic transmission assembly to convert the stored amounts of compressed fluid medium to produce kinetic energy therefrom and operate said mechanical output means on demand.

5. A compressed fluid medium system as defined in claim 4 wherein
   reservoir means is effective to store the stored amounts of compressed fluid medium generated by the operation of said drive motor means and said compressing means.

6. A compressed fluid medium system as defined in claim 4 wherein
   said fluid medium compressing means is an air compressor.

7. A compressed fluid medium system as defined in claim 4 wherein
   said energy conversion means is effective to boost the hydraulic fluid pressure in said hydraulic fluid transmission assembly by said stored amounts of compressed fluid medium.

8. A compressed fluid medium system as defined in claim 7 wherein
   said fluid medium is air, and
   said energy conversion means includes an air driven hydraulic booster mechanism connected to the transmission assembly.

9. A compressed fluid medium system as defined in claim 8 wherein
   said energy conversion means includes a pressure regulator switch connected between the air compressing means and the air driven hydraulic booster mechanism.

10. A compressed fluid medium system as defined in claim 8 wherein
    said energy conversion means includes reservoir means and a pressure regulator,
    the reservoir means is effective to store the amount of compressed air generated by the operation of said drive motor means and said compressing means,
    the pressure regulator is connected to the air driven hydraulic booster mechanism to control the air pressure of the compressed air from the reservoir means and the air compressing means to said hydraulic booster mechanism.

11. A compressed air system for storing energy not used in driving a mechanical output means hydraulically driven by a hydraulic fluid transmission assembly, said compressed air system comprising:
    (a) reservoir means for storing compressed air,
    (b) means for compressing air from a continuous supply of air for said reservoir means,
    (c) hydraulic drive means for operating said air compressing means, and
    (d) diverting means for directly moving hydraulid fluid not used to drive said mechanical output means away from said transmission assembly to said hydraulic drive means, (e) said hydraulic drive means being effective to operate said air compressing means causing amounts of compressed air to be stored in said reservoir means in proportion to the amount of hydraulic fluid being directed thereto by said diverting means, (f) means connected to the transmission assembly for converting said stored amounts of the compressed air to hydraulic fluid energy is directed from said compressed air system to said hydraulic fluid transmission assembly to recapture the kinetic energy of said diverting unused hydraulic fluid from said stored amounts of compressed air.

12. In a hydraulic driven system having a hydraulic transmission assembly including means for directing hydraulic fluid to a mechanical output means, a compressed fluid medium system comprising:

(a) fluid medium compressor means for compressing fluid medium from a continuous supply of fluid medium, (b) hydraulic fluid drive means for operating the compressor means, and (c) diverting means for directing hydraulic fluid not used to drive said mechanical output means away from said hydraulic fluid transmission assembly to said hydraulic fluid drive means, (d) said drive means being effective to produce stored amounts of compressed fluid medium from said continuous supply by said fluid medium compressor in proportion to the amount of hydraulic fluid being diverted from said hydraulic fluid transmission assembly, (e) energy conversion means is connected to said transmission assembly to boost the hydraulic fluid in said hydraulic fluid transmission assembly with fluid medium from said stored amounts of said compressed fluid medium.

13. In a hydraulic drive system as defined in claim 12 wherein
a power source is effective to operate at a constant output level to drive said hydraulic transmission assembly.

14. In a hydraulic drive system as defined in claim 12 wherein
a hydraulic accumulator is effective to store excess power within said hydraulic fluid transmission assembly.

15. In a hydraulic drive system as defined in claim 14 wherein
said fluid medium is air, and
said energy conversion means includes an air driven hydraulic booster mechanism connected to the transmission assembly.

16. In a hydraulic drive system as defined in claim 15 wherein
said energy conversion means includes a pressure regulator switch connected between the air compressing means and the air driven hydraulic booster mechanism.

17. In a hydraulic drive system as defined in claim 15 wherein
said energy conversion means includes reservoir means and a pressure regulator,
the reservoir means is effective to store the amounts of compressed air generated by the operation of said hydraulic fluid drive means and air compressing means,
the pressure regulator is connected to the air driven hydraulic booster mechanism to control the air pressure of the amounts of compressed air from the reservoir means and the air compressing means to said hydraulic booster mechanism.

18. In a hydraulic drive system having a hydraulic fluid transmission assembly including means for directing hydraulic fluid to a mechanical output means, a compressed air system comprising:

(a) means for storing energy, (b) diverting means for directing the amount of hydraulic fluid not used to drive said mechanical output means away from said hydraulic fluid directing means to said compressed air system, (c) said energy storing means including hydraulic drive means connected to said hydraulic fluid diverting means to receive said unused hydraulic fluid for introducing an amount of energy proportional to the diverted amount of hydraulic fluid into said compressed air system from a continuous source of air, and (d) means for directing energy from said energy storing means back to said hydraulic fluid transmission assembly.

19. In a hydraulic drive system as defined in claim 18 wherein
a power source operates at a constant output level to drive said hydraulic fluid transmission assembly.

20. In a hydraulic drive system as defined in claim 18 wherein
a hydraulic accumulator is effective to store excess power within said hydraulic fluid transmission assembly.

21. A method of using energy in an energy output system having a main power source, an energy transmission system and a mechanical output, said method comprising the steps of:

(a) generating kinetic energy with the main power source, (b) transmitting a first portion of said kinetic energy sufficient to drive the mechanical output under operating conditions, (c) diverting a second portion of said kinetic energy not used in driving said mechanical output to an energy storing means, (d) storing said second portion in the energy storing means until it is required for use, said storing step includes compressing fluid medium with said second portion of kinetic energy from a continuous supply of fluid medium to produce stored amounts of compressed fluid medium which provides a source from which energy may be recovered on demand, (e) recovering energy from said second portion on demand, and (f) reintroducing the energy in the recovering step into said energy output system.

22. A method as defined in claim 21 wherein
said energy transmission system includes the use of moving hydraulic fluid, said first portion of energy is transmitted by directing a first portion of said moving hydraulic fluid to the mechanical output,
a second portion of the moving hydraulic fluid is diverted to effect the fluid medium compressing step.

23. A method as defined in claim 22 wherein
said fluid medium is air.

* * * * *